UNITED STATES PATENT OFFICE.

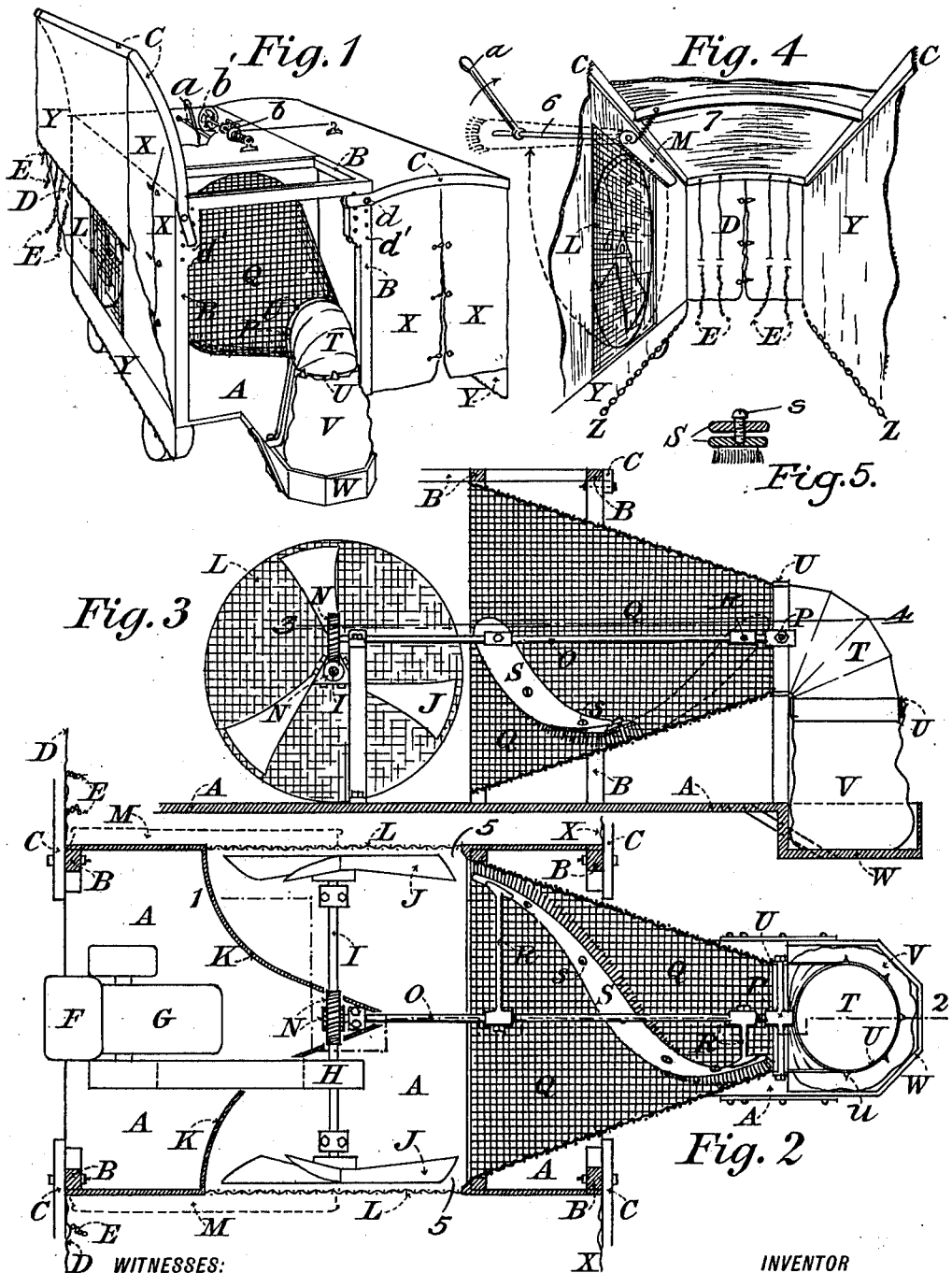

CHARLES B. DRIVER, OF DINUBA, CALIFORNIA.

THRIPS-CATCHING MACHINE.

1,031,172.  Specification of Letters Patent.  Patented July 2, 1912.

Application filed September 1, 1910. Serial No. 580,062.

*To all whom it may concern:*

Be it known that I, CHARLES B. DRIVER, a citizen of the United States, and a resident of Dinuba, in the county of Tulare and State of California, have invented a new and useful Thrips-Catching Machine, of which the following is a specification.

My invention consists of an apparatus in which air-suction is employed for catching many kinds of insects which infest vegetation; but which is designed and adapted especially to catch and destroy grape thrips in vineyards. The said grape thrips or "vine-hopper," as it is sometimes called, is a small, winged, gnawing insect, which subsists chiefly upon the leaves of the grape vine. In some grape-producing sections these thrips are so numerous as to gnaw and injure the grape leaves very severely over vast acreages of vineyard, so that the vines are unable to properly mature their crops of fruit. Prior to my invention no practical method has been known for successfully catching or destroying the thrips in the infested regions.

My invention comprises, essentially, a means of powerful air-suction, driven by a portable engine or other source of power; together with one or more suction-hoods; and an insect-receiving chamber.

In operation in a vineyard the invention is mounted upon a suitable truck or wagon, or other transporting means, and borne through the vineyard, so that the suction-hoods as they are carried along successively cover and inclose the vines in the rows. As the said suction-hoods cover the vines, the thrip which infest said vines are caught up by a suction-draft of air and drawn into the machine, where they are blown into and retained in the insect-receiving chamber, until killed and disposed of as hereinafter explained.

In order that my invention may be better understood, attention is directed to the accompanying drawings, which illustrate one form of my invention, and in which—

Figure 1 is a perspective view of the entire machine; Fig. 2 is a section on the line 3—4, in Fig. 3. Fig. 3 is a vertical section of the rear of the main body of the machine, on the line 1 2, Fig. 2 with parts removed; and Fig. 4 is a perspective interior view of the forward end of the right hood; Fig. 5 is a detail of the brush adjustment.

Similar letters refer to similar parts throughout the several views.

A designates the floor of a suitable truck or wagon on which my invention is mounted; B, the main frame of my invention; and F, the teamster's seat.

C designates the frames of the suction-hoods. Said suction-hoods are constructed with light frameworks of wood or metal, supporting a top covering shown in Figs. 1 and 4, and the side curtains Y, and end curtains D and X, all of closely woven canvas or other equivalent material; or if desired said suction-hoods may in some cases be constructed entirely of wood or metal. These suction-hoods serve two useful purposes: first, to direct the force of the suction-draft, restricting it to the area of the vegetation inclosed by said suction-hoods; the design being to cause the air to be drawn as quickly and abundantly as possible or necessary, from close around and through all parts of the vines to be treated; and as the inserts to be captured are in this air and on the vines in touch with it, they will be drawn into the machine with the suction-draft. The second purpose of the suction-hoods is to prevent the escape of the insects. When a vine or plant is disturbed in the open the insects thereon usually fly away and escape, whereas when the vegetation is disturbed inside a suction-hood, the infesting insects are unable to escape freely, but are held within range of the suction-draft, until it catches and carries them into the machine.

The size and form of suction-hoods to be used as a part of my invention will depend upon the general size and form of the particular vegetation to be treated, and upon the volume and strength of the available air-suction. Whatever form of suction-hood is employed in a machine of the present description, it must only partially inclose the vegetation being treated; otherwise the air supply to furnish the suction-draft will be insufficient. It is therefore desirable to raise the side curtains Y, more or less off the ground, as shown in Figs. 1 and 4, so that an air supply may sweep in under them.

If canvas or other flexible material be used for the side curtains Y, I find it necessary to weight down, or brace, said curtains, so that they will not be drawn out of shape by the suction. This is best effected by attaching chains Z, or other suitable weights, to the lower edges of said curtains. The end curtains D and X, when constructed of flexible material, are generally divided in the center, as shown, in order that they may readily pass over stakes and other obstructions when necessary, without catching or tearing; or they may be fastened together by the hooks or buttons illustrated, when used over lower, unstaked vegetation. The front curtains D, are provided with the dangling and dragging chains E, or other suitable dangling and dragging weights. As the machine moves forward these said chains or weights drag through and strike against the vegetation, so agitating and disturbing it as to cause the insects thereupon to become frightened and to loosen their hold and fly into the air, whence the suction-draft can more readily capture them.

$d$, in Fig. 1, designates a hinge or axis upon which the suction-hoods formed by the containers D, X and Y on the frames C are supported, and on which they may be swung up, as shown in the left-hand suction-hood in Fig. 1, so as to clear and pass obstructions, such as large trees, etc., that may be encountered; and also for the purpose of making the machine more compact when not in use. For thus swinging up the suction-hoods, $b$, in Fig. 1, represents a drum and ratchet, operated by a handwheel $b'$, for winding the rope attached to a suction-hood. Underneath the hinge or axis suction-hood support $d$, Fig. 1, is shown a series of hinge or axis holes $d'$ into any of which the hinge or axis may be lowered, in order to lower the suction-hoods, if desired.

In my invention I have found that the volume of air moved in the suction-draft of a full size thrips-catching machine must be very great, and that it must be moved with a sufficient velocity to thwart the thrips in their efforts to resist the said suction-draft, or to escape therefrom. In an experimental model of my invention, having two suction-hoods as shown in the accompanying drawings, and for use in grape vineyards for catching the grape thrips, I employ a ten horsepower gasolene engine to drive the suction fans, J disposed in a suction chamber 5 arranged between and opening to the suction hoods; but I shall prefer for practical and general use, with a machine of this size, an engine of greater power. For producing the suction-draft I have found that the large, three-bladed fans J, of the type shown, are quite efficient, when driven at a high rate of speed. It is to be understood, however, that any other suitable means of air-suction of the required capacity, will in no wise alter the spirit of my invention and may be used in place of the fans, as a part of the invention.

I represents the main shaft of the machine, and bears the suction fans J, the worm gear N, and the pulley H, which pulley is connected by belt with the engine G. In practice I may employ any other suitable transmission between the engine and the means of suction, in place of said belt and pulley transmission.

Over the suction openings through which the suction-draft is drawn from the suction-hoods it is desirable to place the screen gratings L, to prevent limbs, leaves, and large pieces of vegetation, etc., being drawn into and thereby clogging and interfering with, the fans or other means of suction. Said gratings should be made of heavy wire screening with half or three-quarter inch mesh; or they may be of any other suitable construction for the purpose specified.

When the machine is in operation, the suction-draft sucks up leaves, etc., from the vines and the ground, and holds them tightly against the gratings L, so much so as to seriously cut off and interfere with the suction-draft. I have therefore provided the brushes M, which may be drawn across the said gratings to brush away and remove the said accumulated obstructing matter. The said brushes M, are both mounted upon a shaft 6 passing through the body of the machine, directly above the openings leading from the suction hoods to the suction chamber 5, said shaft being provided or fitted with a lever, as shown by $a$, Fig. 4, for suitably turning said shaft and attached brushes M. When said brushes are not in use they may be held by a suitable means, such as a spiral spring 7, in the position illustrated by M, Fig. 4. It is understood, however, that I may employ any other suitable form of brushes instead of the said brushes M, and for the purpose specified.

K, Fig. 2, designates curved deflecting partitions, so shaped as to turn the impinging air-draft, received from the fans J, rearward into and through the screen delivery passage Q. The said screen delivery passage Q, is constructed of suitable screen-like material, of such closeness of mesh as to prevent the escape of the captured insects. It may be of either cloth, netting, or wire screening. I prefer to make said passage of strong, steel-wire screening; to stiffen and support said passage by means of a suitable framework; and to allow enough surface area of screening in my construction, as to permit a very free exit for the air-draft received from the fans. I find, however, in operating the machine, that the captured insects, along with broken leaves, etc., carried in by the air-draft, are lodged against the inner surface of the screen delivery passage, and soon accumulate in such quantity as to largely shut off the exit of the air-draft, and so seriously impair the efficiency of the machine. I therefore prefer to employ a screen delivery passage, either cylindrical, or funnel-shaped in form, as at Q, Figs. 1, 2, and 3, and provided with an internally-revolving brush, S, for brushing and cleaning the inner surface of the delivery passage and for brushing to pieces and killing the accumulated layer of captured insects lodged on the inner surface of said passage. Said brush may be straight, but is preferably in the form of a curve, partial spiral, or screw. Said brush as it revolves loosens the accumulated matters above referred to, from the said inner surface of the delivery passage, and, conjointly with the air-draft, moves and works them toward and through a suitable discharge opening in the rear end of the screen delivery passage. I have found it desirable to make said brush S, of a two-part construction with the bristle-carrying portion adjustable by means of set-out screws or bolts s, Figs. 2, 3 and 5, so that it may be caused to brush lightly or heavily, as desired, upon the surface to be cleaned. It is moreover desirable to revolve said killing and cleaning brush S, slowly. I have therefore connected the secondary shaft O, (on which the said brush is mounted by means of the arms R), with the main shaft I, by means of suitable speed-reducing worm gearing N. P indicates a pivotal bearing for supporting the rear end of said secondary shaft, as illustrated in Figs. 2 and 3. A removable sack V, or other suitable receiving receptacle, is attached to the end of the elbow T, through which the screen passage discharges. The said sack is supported by the hooks u, Fig. 2, and the bracket W. U designates certain strengthening rings, collars, or hoops, upon the parts shown.

I am aware that prior to my invention air-suction has been used with various forms of suction-hoods and receiving chambers, in vacuum cleaning, street sweeping, and similar dust-gathering apparatus; and that in woodworking establishments, suction-hoods are built in over various machinery to draw up shavings, sawdust, etc. I therefore do not claim a means of suction, suction-hood, and receiving receptacle combination broadly, but only for the purposes specified.

Having thus described my invention, what I claim and desire to secure by Letters Patent is—

1. A traveling insect catching apparatus, including a suction chamber, having inlet and discharge openings, means for producing a draft through the inlet opening, a frame hinged above the inlet opening, flexible curtains dependent from said frame and forming the walls of a suction hood and adapted to direct the air draft through the foliage which harbors the insects.

2. A traveling insect catching apparatus comprising a suction chamber with inlet and discharge openings, means for producing a draft through the inlet opening, a frame hinged and movable with relation to the inlet opening, flexible curtains supported from said frame, and adapted to drop over the vines and foliage, a screen covering the inlet opening, a brush movable over the outer surface of the screen whereby leaves and the like are prevented from adhering thereto, and means for moving the brush over the screen.

3. A traveling insect catching apparatus, comprising a suction chamber with inlet and discharge openings, means for producing a draft through the inlet opening, a frame hinged and movable with relation to the inlet opening, flexible curtains supported from said frame and adapted to drop over the vines or foliage, means for deflecting the air received through the inlet opening, a delivery passage connecting therewith, means connected with the delivery passage to receive the collected insects, and a brush movable over the interior surface of the delivery passage to prevent accumulations thereon.

4. A traveling insect catching apparatus comprising a suction chamber with inlet and discharge openings, means for producing a draft through the inlet opening, a frame hinged and movable with relation to the inlet opening, flexible curtains supported from said frame, and adapted to drop over the vines or foliage, means for deflecting the air received through the inlet opening, a delivery passage connecting therewith, means connected with the delivery passage to receive the collected insects, a brush movable over the interior surface of the delivery passage to prevent accumulations thereon, and means for adjusting the brush toward the periphery of the said passage.

5. A traveling insect catching apparatus, comprising a suction chamber with inlet and discharge openings, means for producing a draft through the inlet opening, a frame hinged and movable with relation to the inlet opening, flexible curtains supported from said frame and adapted to drop over the vines or foliage, means for deflecting the air received through the inlet opening, a delivery passage connecting therewith, means connected with the delivery passage to receive the collected insects, said delivery passage being made of foraminous material to allow the escape of air, and a revolving brush adjustable toward the periphery of the said passage to dislodge adherent matter from the interior of said delivery passage.

6. A traveling insect catching apparatus comprising a suction chamber with inlet and discharge openings, means for producing a draft through the inlet opening, a frame hinged and movable with relation to the inlet opening, flexible curtains supported from said frame and adapted to drop over the vines or foliage, means for deflecting the air received through the inlet opening, a delivery passage connecting therewith, means connected with the delivery passage to receive the collected insects, said delivery passage being made of foraminous material to allow the escape of air, a spirally disposed revolving brush adjustable toward the periphery of said passage to dislodge adherent material from the interior of the said delivery passage, and means for producing a reduced speed of revolution of the brush.

CHARLES B. DRIVER.

Witnesses:
M. T. WALLACE,
D. S. AMSDEN.

Copies of this patent may be obtained for five cents each, by addressing the "Commissioner of Patents, Washington, D. C."